(12) United States Patent
Sun et al.

(10) Patent No.: US 12,460,917 B2
(45) Date of Patent: Nov. 4, 2025

(54) INTERFEROMETER DISPLACEMENT MEASUREMENT SYSTEM AND METHOD

(71) Applicants: BEIJING U-PRECISION TECH CO., LTD., Beijing (CN); Beijing United Victory Precision Technology Co., Ltd., Beijing (CN)

(72) Inventors: Guohua Sun, Beijing (CN); Xiaoliang Gao, Beijing (CN); Lei Xu, Beijing (CN)

(73) Assignees: BEIJING U-PRECISION TECH CO., LTD., Beijing (CN); Beijing United Victory Precision Technology Co., Ltd., Beijing (CN)

( * ) Notice: Subject to any disclaimer, the term of this patent is extended or adjusted under 35 U.S.C. 154(b) by 147 days.

(21) Appl. No.: 18/037,655

(22) PCT Filed: Oct. 22, 2021

(86) PCT No.: PCT/CN2021/125623
§ 371 (c)(1),
(2) Date: May 18, 2023

(87) PCT Pub. No.: WO2022/105533
PCT Pub. Date: May 27, 2022

(65) Prior Publication Data
US 2023/0417532 A1    Dec. 28, 2023

(30) Foreign Application Priority Data
Nov. 18, 2020  (CN) .......................... 202011293860.0

(51) Int. Cl.
*G01B 9/02001*    (2022.01)
*G01B 9/02055*    (2022.01)
*G01B 11/14*      (2006.01)

(52) U.S. Cl.
CPC ..... *G01B 9/02001* (2013.01); *G01B 9/02077* (2013.01); *G01B 11/14* (2013.01); *G01B 2290/70* (2013.01)

(58) Field of Classification Search
CPC .. G01B 9/02; G01B 9/02001; G01B 9/02077; G01B 9/02019; G01B 9/0205; G01B 2290/70; G01B 11/02; G01B 11/14
See application file for complete search history.

(56) References Cited

U.S. PATENT DOCUMENTS

| 6,020,964 | A  | 2/2000 | Loopstra et al. |
| 6,445,453 | B1 | 9/2002 | Hill |

(Continued)

FOREIGN PATENT DOCUMENTS

| CN | 101629810 A | 1/2010 |
| CN | 102226690 A | 10/2011 |

(Continued)

OTHER PUBLICATIONS

International Search Report from International Application No. PCT/CN2021/125623 mailed Jan. 18, 2022.

*Primary Examiner* — Uzma Alam
*Assistant Examiner* — Justin J Van Cleave
(74) *Attorney, Agent, or Firm* — Shih IP Law Group, PLLC (57) ABSTRACT

Interferometer displacement measurement system and method are disclosed, wherein, a measurement light is processed by a first polarization splitting prism, a first ¼ wave plate, a first splitting prism, an optical waveguide component and a reflector, and then is returned to a first photoeletric detector and a second photoeletric detector. The reference light is processed by a second polarization splitting prism, a second ¼ wave plate, a second splitting prism and a reflecting mirror, and then is returned to the first photoeletric detector and the second photoeletric detector.

(Continued)

The first photoeletric detector forms a measurement signal according to the processed measurement light and the processed reference light, and the second photoeletric detector forms a reference signal according to the processed measurement light and the processed reference light. Displacement information of the object to be detected is determined according to the measurement signal and the reference signal.

10 Claims, 4 Drawing Sheets

(56) References Cited

U.S. PATENT DOCUMENTS

| | | | |
|---|---|---|---|
| 6,897,962 | B2 | 5/2005 | Johnstone et al. |
| 6,980,279 | B2 | 12/2005 | Novak |
| 2005/0052749 | A1 | 3/2005 | Rope et al. |
| 2005/0162639 | A1 | 7/2005 | Stierle |
| 2006/0114473 | A1* | 6/2006 | Tearney ............... A61B 5/0066 356/479 |
| 2007/0024860 | A1* | 2/2007 | Tobiason ........... G01B 9/02081 356/498 |
| 2011/0043819 | A1* | 2/2011 | Sugiura .............. G01B 9/02018 356/244 |
| 2021/0010794 | A1* | 1/2021 | Bai .................... G01B 9/02007 |

FOREIGN PATENT DOCUMENTS

| | | |
|---|---|---|
| CN | 105004273 A | 10/2015 |
| CN | 106225667 A | 12/2016 |
| CN | 108592800 A | 9/2018 |
| CN | 109579777 A | 4/2019 |
| CN | 110411335 A | 11/2019 |
| CN | 110441032 A | 11/2019 |
| CN | 209894118 U | 1/2020 |
| CN | 111896222 A | 11/2020 |
| CN | 112484647 A | 3/2021 |

* cited by examiner

INTERFEROMETER DISPLACEMENT MEASUREMENT SYSTEM AND METHOD

TECHNICAL FIELD

The present disclosure relates to a technical field of precision displacement measurement, and more particularly, to an interferometer displacement measurement system and an interferometer displacement measurement method.

DESCRIPTION OF RELATED ART

Precision measurement is the basis of precision machining. Especially, for IC equipment, resolution at a nanometer level or even at a sub nanometer level has become standard and requirement for the precision measurement. Currently, laser interferometers and grating interferometers are research objects for the precision measurement, and the requirements for resolutions of laser interferometers and grating interferometers get higher and higher.

However, in the actual displacement measurement process, factors such as object movement may cause a grating or a reflecting mirror to generate a small angle. Due to the appearance of stripes within a scope of an interference spot, directly detecting the interference spot by a photoeletric detector may result in poor signal quality. Currently, the main method to solve the problem of poor signal quality is to convert angled light beams into parallel light beams by optical components, in this way, the stripes in an interference area may be eliminated, but there still exists the circumstance of light spot separation. Due to the light spot separation, the size of the light spot needs to be increased in the scenario of using long-distance measurement. Compared with a small light spot, a large light spot not only reduces a scope for measuring the angle, but also deteriorates wavefront quality of the light beam due to environment. Since the quality of a measurement signal directly affects the measurement result and the wavefront quality of the light beam also affects the measurement accuracy, these problems need to be solved urgently in the actual measurement process.

With respect to the above problems, both of U.S. Pat. Nos. 6,020,964A and 6,980,279B2 use a pyramid prism to return light. The light entering the pyramid prism is parallel to an emitting light, to ensure that the final returned light is parallel to the incident light and prevent angle interference. However, it results in a large structure of the interferometer and the light spot separation occurs when the measurement stroke has certain long stroke. In addition, a U.S. Pat. No. 6,897,962B2 has disclosed an eight-magnification subdivision interferometer, which enables two light spots to always have overlapping region in the measurement stroke by using a pyramid prism return light and a large light spot measurement. However, the large light spot also has a problem that the wavefront of the light spot is more susceptible to factors such as air disturbance, resulting in low measurement accuracy and limited application scope.

SUMMARY

In view of the above problems, an object of the present disclosure is to provide an interferometer displacement measurement system and an interferometer displacement measurement system method, to solve the problems of large volume, poor detection quality, low accuracy and limited application scope of current interferometers.

The interferometer displacement measurement system provided by the present disclosure comprises: a first laser light source for emitting measurement light; a first polarization splitting prism, a first photoelectric detector, a first ¼ wave plate, a first splitting prism, an optical waveguide component and a reflector, disposed on one side of the first laser light source sequentially, wherein an object to be detected is fixed on the reflector; a second laser light source for emitting reference light; and a second polarization splitting prism, a second photoelectric detector, a second ¼ wave plate, a second splitting prism and a reflecting mirror attached to the second splitting prism side, disposed on one side of the second laser light source sequentially, wherein, the measurement light is processed by the first polarization splitting prism, the first ¼ wave plate, the first splitting prism, the optical waveguide component and the reflector, and then is returned to the first photoelectric detector and the second photoelectric detector, wherein the reference light is processed by the second polarization splitting prism, the second ¼ wave plate, the second splitting prism and the reflecting mirror, and then is returned to the first photoelectric detector and the second photoelectric detector, wherein the first photoelectric detector generates a measurement signal according to the processed measurement light and the processed reference light, and the second photoelectric detector forms a reference signal according to the processed measurement light and the processed reference light, and wherein displacement information of the object to be detected is determined according to the measurement signal and the reference signal.

Further, a preferred technical solution is that, the optical waveguide component comprises: a lens fixing element; a first plano-convex lens and a second plano-convex lens disposed within the lens fixing element; and a waveguide fiber and a reflective film positioned between the first plano-convex lens and the second plano-convex lens, wherein, the lens fixing element is made of glass, and the reflective film is attached to a right end surface of the lens fixing element adjacent to the reflector.

Further, a preferred technical solution is that, a distance from the first plano-convex lens to a left end surface of the lens fixing element is a first focal length, and a distance from the second plano-convex lens to the right end surface of the lens fixing element is a second focal length, and the first focal length equals to the second focal length.

Further, a preferred technical solution is that, the measurement light is transmitted by the first polarization splitting prism and passes through the first ¼ wave plate, and then is divided into a first transmission light and a first reflection light by the first splitting prism, wherein the first transmission light is coupled to the waveguide fiber after passing through the first plano-convex lens, and then passes through the second plano-convex lens to arrive at the reflector, wherein the light reflected back by the reflector passes through the second plano-convex lens to arrive at the reflective film, and is reflected to the reflector by the reflective film again, and the light reflected by the reflector is coupled to the waveguide fiber after passing through the second plano-convex lens again, and the light passes through the first plano-convex lens, the first splitting prism and the first ¼ wave plate sequentially to become a first s-polarized light, and wherein the first s-polarized light is reflected to the first photoelectric detector by the first polarization splitting prism.

Further, a preferred technical solution is that, the first reflection light of the first splitting prism is reflected by the second splitting prism, and the reflected light passes through the second ¼ wave plate to become a second s-polarized light; and the second s-polarized light is reflected to the second photoeletric detector by the second polarization splitting prism.

Further, a preferred technical solution is that, the reference light transmits through the second polarization splitting prism and then is divided into a second transmission light and a second reflection light by the second ¼ wave plate and the second splitting prism, wherein the second transmission light is reflected back by the reflecting mirror, and passes through the second splitting prism and the second ¼ wave plate to become a third s-polarized light, wherein the third s-polarized light is reflected to the second photoeletric detector by the second polarization splitting prism, wherein the second reflection light passes through the first polarization splitting prism and then passes through the first ¼ wave plate, to become a fourth s-polarized light, and wherein the fourth s-polarized light is reflected to the first photoeletric detector by the second polarization splitting prism.

Further, a preferred technical solution is that, the first photoeletric detector is configured to form the measurement signal according to light beam interference and photoelectric conversion of the first s-polarized light and the fourth s-polarized light, and wherein the second photoeletric detector is configured to form the reference signal according to light beam interference and photoelectric conversion of the second s-polarized light and the third s-polarized light.

Further, a preferred technical solution is that, both of the measurement light and the reference light are p-polarized light, and the reflector is a reflecting mirror or a grating.

Further, a preferred technical solution is that, an expression formula for the displacement information of the reflector is:

$$\Delta z = \frac{\lambda(\varphi_1 - \varphi_2)}{2\pi \times 2\left(1 + \frac{1}{\cos\theta}\right)}$$

Wherein, $\Delta z$ is the displacement information, $\lambda$ is a wavelength of the light beam in the air, $\varphi_1$ is the phase of the measurement signal after phase discrimination, and $\varphi_2$ is the phase of the reference signal after phase discrimination, $\theta$ is an installation angle of the reflector relative to y-axis direction.

According to another aspect of the present disclosure, it is provided an interferometer displacement measurement method for measuring displacement of an object to be measured by the above-described interferometer displacement measurement system, the interferometer displacement measurement method comprises following steps: emitting measurement light by a first laser source, and emitting reference light by a second laser source; sequentially processing the measurement light by a first polarization splitting prism, a first ¼ wave plate, a first splitting prism, an optical waveguide component and a reflector, and then returning the measurement light to a first photoeletric detector and a second photoeletric detector, and generating a measurement signal by the first photoeletric detector according to the processed measurement light and the processed reference light; at the same time, sequentially processing the reference light by a second polarization splitting prism, a second ¼ wave plate, a second splitting prism and a reflecting mirror, and then returning the reference light to the first photoeletric detector and the second photoeletric detector, and generating a reference signal by the second photoeletric detector according to the processed measurement light and the processed reference light; and determining displacement information of the object to be detected according to the measurement signal and the reference signal.

By using the interferometer displacement measurement system and the interferometer displacement measurement method described above, nanometer level resolution can be achieved, and the impact on stripe contrast by the angle to be measured can be effectively eliminated, so as to adapt to the actual use situation where there is a large angle installation. In addition, the measurement system can effectively compensate for air disturbance errors, and there is no necessary for large-sized light spot to adapt to the light spot separation caused by angle. Compared with the existing interferometer, it has smaller spot size measurement capabilities and can reduce the impact on measurement due to air.

In order to achieve the above and related objects, one or more aspects of the present disclosure include the features to be explained in detail later. The following explanation and drawings provide a detailed explanation of certain exemplary aspects of the present disclosure. However, these aspects only indicate some of the various ways in which the principles of the present disclosure can be used. In addition, the present disclosure is intended to include all these aspects and their equivalents.

BRIEF DESCRIPTION OF DRAWINGS

By referring to the following explanations in combination with the drawings, and with more complete understanding of the present disclosure, other objects and results of the present disclosure will be clearer and easier to be understood. In the drawings.

In the drawings, the reference signs comprise: first laser light source 10, second laser light source 11, first polarization splitting prism 20, second polarization splitting prism 21, first photoeletric detector 30, second photoeletric detector 31, first ¼ wave plate 40, second ¼ wave plate 41, first splitting prism 50, second splitting prism 51, optical waveguide component first plano-convex lens 60.1, lens fixing element 60.2, waveguide fiber 60.3, reflective film second plano-convex lens 60.5, reflector 70, reflecting mirror 80, reflecting mirror 81, grating 90 and photoeletric detector group 100.

In all of the drawings, the same reference signs indicate similar or corresponding features or functions.

DETAILED DESCRIPTIONS

In the following description, for illustrative purposes, many specific details are expounded to provide a comprehensive understanding of one or more embodiments. However, it is obvious that these embodiments can also be implemented without these specific details. In other examples, for the convenience of describing one or more embodiments, well-known structures and devices are shown in block diagrams.

To provide a detailed description of the interferometer displacement measurement system and the interferometer displacement measurement method of the present disclosure, specific embodiments of the present disclosure will be described in detail in combination with the drawings.

Figure 1:
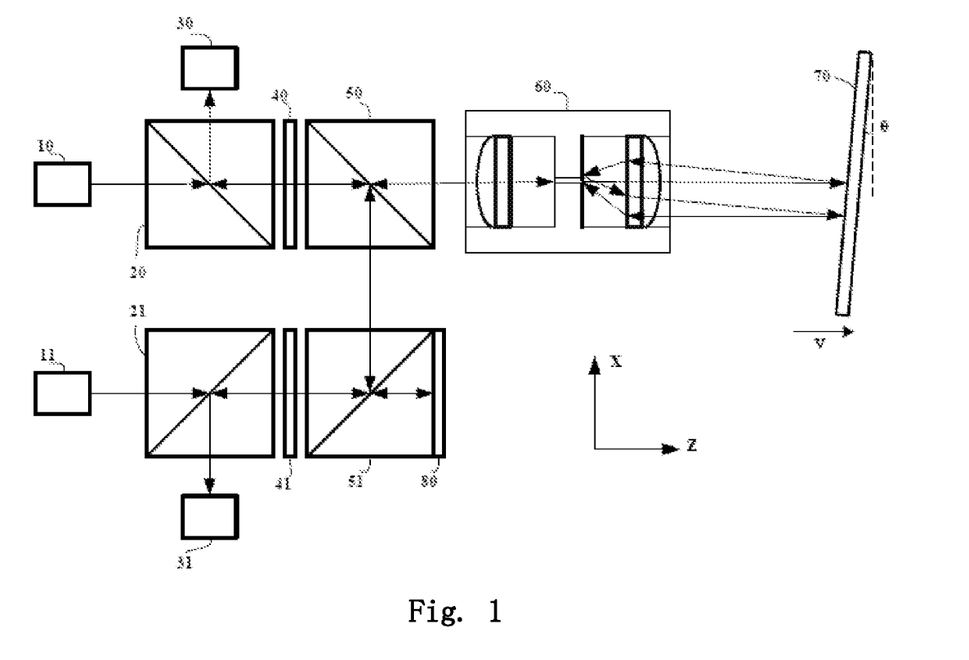
FIG. 1 is a structural schematic diagram of an interferometer displacement measurement system according to an embodiment of the present disclosure.

FIG. 1 shows a schematic structure of an interferometer displacement measurement system according to an embodiment of the present disclosure.

As shown in FIG. 1, the interferometer displacement measurement system of the embodiment of the present disclosure comprises: a first laser light source 10 for emitting measurement light; a first polarization splitting prism 20, a first photoelectric detector 30, a first ¼ wave plate 40, a first splitting prism 50, an optical waveguide component 60 and a reflector on which an object to be detected is fixed, disposed on one side of the first laser light source sequentially; a second laser light source 11 for emitting reference light; and a second polarization splitting prism 21, a second photoelectric detector 31, a second ¼ wave plate 41, a second splitting prism 51 and a reflecting mirror 80 attached to the second splitting prism 51 side, disposed on one side of the second laser light source 11 sequentially.

Wherein, the measurement light is processed by the first polarization splitting prism the first ¼ wave plate 40, the first splitting prism 50, the optical waveguide component 60 and the reflector 70, and then is returned to the first photoeletric detector 30 and the second photoelectric detector 31. The reference light is processed by the second polarization splitting prism 21, the second ¼ wave plate 41, the second splitting prism 51 and the reflecting mirror and then is returned to the first photoelectric detector 30 and the second photoelectric detector 31. The first photoelectric detector 30 forms a measurement signal according to the processed measurement light and the processed reference light, and the second photoelectric detector 31 forms a reference signal according to the processed measurement light and the processed reference light. Finally, displacement information of the object to be detected is determined based on the measurement signal and the reference signal.

Figure 2:
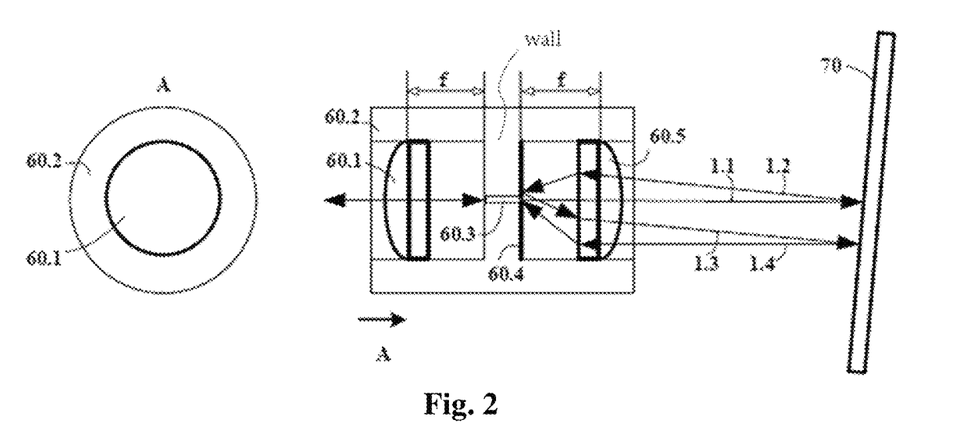
FIG. 2 is a structural schematic diagram of an optical waveguide component according to an embodiment of the present disclosure.

FIG. 2 shows a schematic structure of the optical waveguide component according to an embodiment of the present disclosure.

As shown in FIG. 1 and FIG. 2, the optical waveguide component 60 of the embodiment of the present disclosure comprises a lens fixing element 60.2, a first plano-convex lens 60.1 and a second plano-convex lens 60.5 disposed within the lens fixing element 60.2, and a waveguide fiber 60.3 and a reflective film 60.4 positioned between the first plano-convex lens and the second plano-convex lens 60.5. Wherein, along an A direction, the optical waveguide component has a circular structure, the lens fixing element 60.2 is made of glass, and the reflective film 60.4 is attached to a right end surface of the lens fixing element 60.2 adjacent to the reflector 70.

Wherein, a distance from the first plano-convex lens 60.1 to a left end surface of the lens fixing element 60.2 is a first focal length f, and a distance from the second plano-convex lens 60.5 to the right end surface of the lens fixing element 60.2 is a second focal length f. The first focal length equals to the second focal length.

In the interferometer displacement measurement system provided by the present disclosure, the reflecting mirror 70 needs to be installed by tilting at a certain angle θ to achieve four subdivision measurement. Providing the optical waveguide component 60 enable the interferometer displacement measurement system to allow the angle of the reflecting mirror 70 due to factors such as movement and installation, without occurring the phenomenon of light spot separation. Wherein, the incident light beam entering the optical waveguide component passes through the first plano-convex lens 60.1 and is then coupled to the waveguide fiber subsequently is collimated into a light beam 1.1 by the second plano-convex lens 60.5, the light beam 1.1 is reflected by the reflecting mirror 70 to form a light beam 1.2, then the light beam 1.2 passes through the second plano-convex lens 60.5 to a point on a focal plane, that is, a point on the reflective film 60.4, subsequently, the light beam reflected by the reflective film 60.4 passes through the second plano-convex lens 60.5 to form a light beam 1.3. Due to the characteristic of the plano-convex lens, the light beam 1.2 is parallel to the light beam 1.3, therefore a light beam 1.4 is parallel to the light beam 1.1, thereby the light beam 1.4 is converged to a core of the waveguide fiber 60.3. Even if there is a certain angle change in the reflector 70, the light beam 1.4 can always be converged into the fiber core of the waveguide fiber 60.3, and the waveguide fiber 60.3 has a very small core radius. After passing through the fiber core of the waveguide fiber 60.3 and then passing through the first plano-convex lens 60.1 to be parallel to the incident light, and the phenomenon of light spot separation substantially does not occur.

Figure 3:
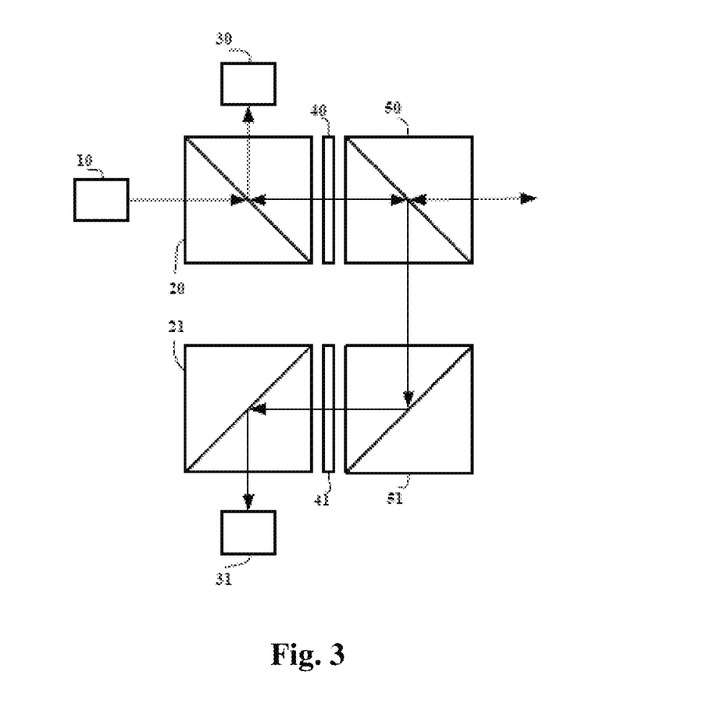
FIG. 3 is a schematic diagram of an optical path of measuring light according to an embodiment of the present disclosure.

Specifically, FIG. 3 shows an optical path structure of the measurement light according to an embodiment of the present disclosure.

As shown in FIG. 1 to FIG. 3, in the interferometer displacement measurement system of the embodiment of the present disclosure, the measurement light is p-polarized light, the measurement light is transmitted by the first polarization splitting prism 20 and passes through the first ¼ wave plate 40, and then is divided into a first transmission light and a first reflection light by the first splitting prism 50. Wherein, the first transmission light is coupled to the waveguide fiber 60.3 after passing through the first plano-convex lens 60.1, and then passes through the second plano-convex lens 60.5 to arrive at the reflector 70. The light reflected back by the reflector 70 passes through the second plano-convex lens 60.5 to arrive at the reflective film 60.4, the reflective film 60.4 reflects the light to the reflector 70 again, and the light reflected by the reflector 70 passes through the second plano-convex lens 60.5 again to couple to the waveguide fiber 60.3, and it passes through the first plano-convex lens 60.1, the first splitting prism 50, and the first ¼ wave plate 40 sequentially to become a first s-polarized light. The first s-polarized light is reflected to the first photoeletric detector 30 by the first polarization splitting prism 20.

Further, the first reflection light of the first splitting prism 50 is reflected by the second splitting prism 51, and the reflected light becomes a second s-polarized light after passing through the second ¼ wave plate 41. The second s-polarized light is reflected to the second photoeletric detector 31 by the second polarization splitting prism 21.

Figure 4:
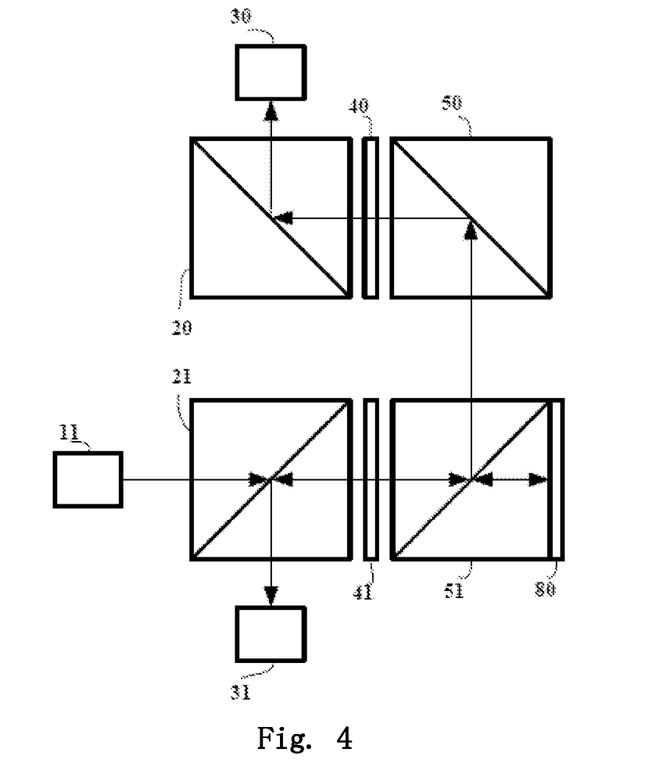
FIG. 4 is a schematic diagram of an optical path of reference light according to an embodiment of the present disclosure.

FIG. 4 shows an optical path structure of the reference light according to an embodiment of the present disclosure.

As shown in FIG. 1 to FIG. 4, in the interferometer displacement measurement system of the embodiment of the present disclosure, the reference light is p-polarized light, the reference light is transmitted by the second polarization splitting prism 21 and then is divided into a second transmission light and a second reflection light by the second ¼ wave plate 41 and the second splitting prism 51. Wherein, the second transmission light is reflected back by the reflecting mirror 80, and becomes a third s-polarized light after passing through the second splitting prism 51 and the second ¼ wave plate 41. The third s-polarized light is reflected to the second photoeletric detector 31 by the second polarization splitting prism 21. The second reflection light passes through the first polarization splitting prism 20 and then passes through the first ¼ wave plate 40 to become a fourth s-polarized light. The fourth s-polarized light is reflected to the first photoeletric detector 30 by the second polarization splitting prism 21.

Further, the first photoeletric detector 30 forms the measurement signal based on light beam interference and photoelectric conversion of the first s-polarized light and the fourth s-polarized light. The second photoeletric detector 31 forms the reference signal based on light beam interference and photoelectric conversion of the second s-polarized light and the third s-polarized light.

As shown in FIG. 1 to FIG. 4, in the interferometer displacement measurement system of the embodiment of the present disclosure, the reflector 70 performs one-dimensional movement with the object to be measured, and the reflector 70 is installed to maintain a fixed angle θ. When the motion of the object to be measured drives the reflector 70 to move, according to the Doppler effect, a phase shift $\alpha_1$ related to the displacement is introduced in the light beam 1.4. Due to the disturbance of the first laser source 10 etc., an error phase shift $\alpha_2$ is introduced, and due to the disturbance of the second laser source 11 etc., an error phase shift $\alpha_3$ is introduced.

It can be known that the measurement light and the reference light entering the first photoeletric detector 30 interfere with each other and form the measurement signal through the photoelectric conversion. The measurement light and the reference light entering the second photoeletric detector 31 interfere with each other and form the reference signal through the photoelectric conversion. The result of phase discrimination of the measurement signal is $\varphi_1 = \alpha_1 + \alpha_2 - \alpha_3$, and the result of phase discrimination of the reference signal is $\varphi_2 = \alpha_2 - \alpha_3$. Therefore, finally, an expression formula for the displacement of the reflector 70 is:

$$\Delta z = \frac{\lambda(\varphi_1 - \varphi_2)}{2\pi \times 2\left(1 + \frac{1}{\cos\theta}\right)}$$

Wherein, $\Delta z$ is the displacement information, $\lambda$ is a wavelength of the light beam in the air, and in the present disclosure, $\lambda$, is the wavelength of the laser in the air, $\varphi_1$ is the phase of the measurement signal after phase discrimination, and $\varphi_2$ is the phase of the reference signal after phase discrimination, θ is an installation angle of the reflector 70 relative to y-axis direction.

It can be known that the interferometer displacement measurement system of the present disclosure can solve the problems of light spot separation and stripe contrast attenuation caused by the angle of the object to be measured, and there is no circumstance of light spot separation. Therefore, the size of the measured light spot can be smaller, and the error caused by air disturbance can also be smaller.

It should be noted that the measurement system of the present disclosure requires the reflector 70 to be installed to maintain a fixed angle θ, to ensure that the light beam 1.2 can be emitted to arrive at the reflective film 60.4.

It should be noted that the above reflector 70 may use a reflecting mirror or a grating. Specifically, FIG. 5 illustrates a grating structure according to an embodiment of the present disclosure.

Figure 5:
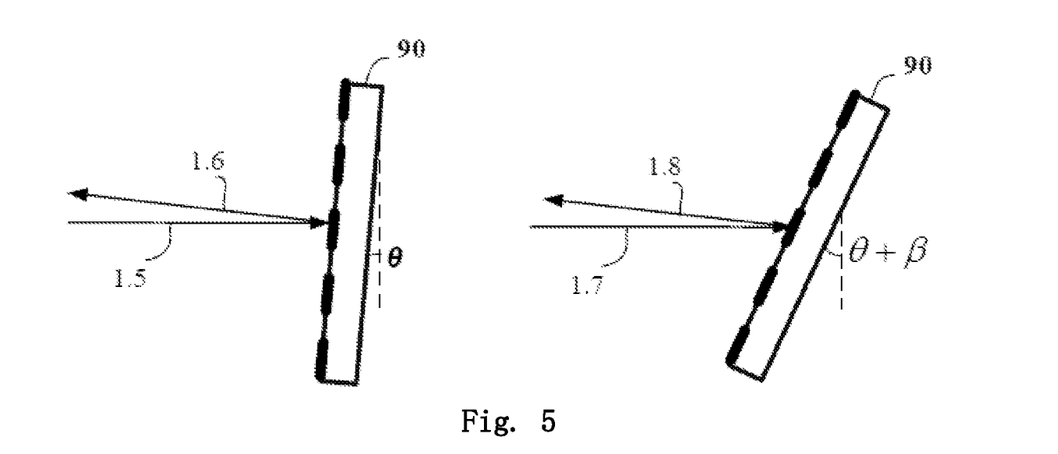
FIG. 5 is a structural schematic diagram of a grating according to an embodiment of the present disclosure.

As shown in FIG. 5, a grating 90 is substitute for the reflector to diffract the returned light, which does not affect the measurement result of the interferometer displacement measurement system. As for the grating, when the incident light is perpendicular to the plane of the grating 90, the 0-order diffracted light returns back along the original path. When the incident light is incident to the grating 90 at a Littrow angle β, +1 or −1 order diffracted light may return back along the original path. Wherein, the Littrow angle is β=arcsin (λ/2p), λ is the laser wavelength, and p is the spacing of the grating. A first form is to rotate the grating 90 by an angle of θ, the light beam 1.5 is incident on the grating, then a 0-order diffracted light beam 1.6 returns back. The second form is to rotate the grating 90 by an angle of θ+β, the light beam 1.7 is incident on the grating, then +1 or −1 order diffracted light beam 1.8 returns back. It can be known that the interferometer displacement measurement system using the grating is applicable to the grating interferometer.

Similar as the above-described interferometer displacement measurement, the present disclosure also provides a zero difference interferometer. Specifically, FIG. 6 shows a schematic structure of the zero difference interferometer according to an embodiment of the present disclosure.

Figure 6:
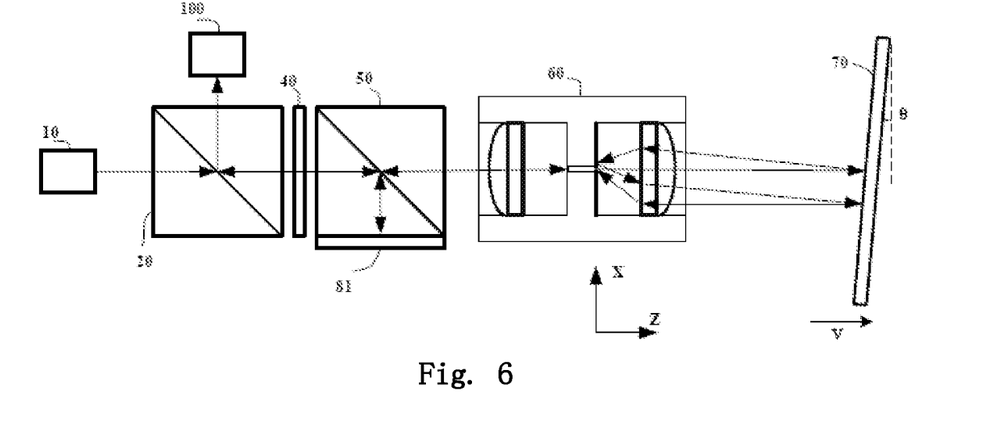
FIG. 6 is a structural schematic diagram of a zero difference interferometer according to an embodiment of the present disclosure.

As shown in FIG. 6, the structural part of the existing reference light is removed and one reflecting mirror 81 is added. At the same time, a photoeletric detector group 100 substitutes for the first photoeletric detector, so that the interferometer displacement measurement can be used to achieve phase discrimination of the zero difference interference signal. At this time, the measurement system is a zero difference interferometer measurement system.

Corresponding to above-described interferometer displacement measurement system, the present disclosure also provides an interferometer displacement measurement method. Specifically, FIG. 7 illustrates a flowchart of the interferometer displacement measurement method according to an embodiment of the present disclosure.

Figure 7:
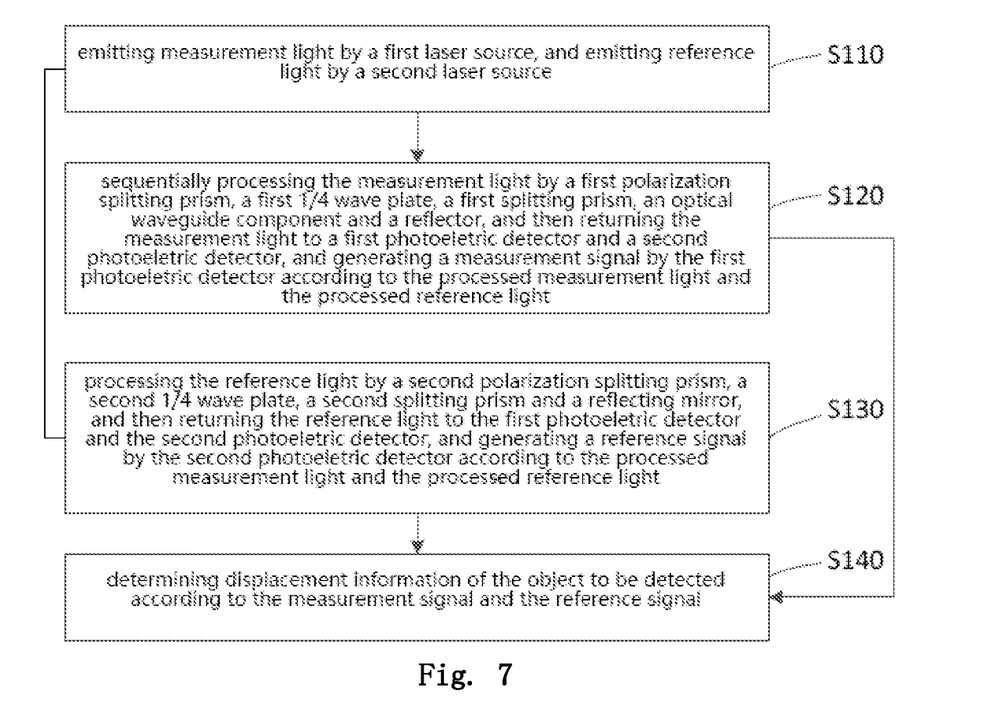
FIG. 7 is a flowchart of an interferometer displacement measurement method according to an embodiment of the present disclosure.

As shown in FIG. 7, the interferometer displacement measurement method of the embodiment of the present disclosure comprises the following steps:

emitting measurement light by a first laser source, and emitting reference light by a second laser source;

sequentially processing the measurement light by a first polarization splitting prism, a first ¼ wave plate, a first splitting prism, an optical waveguide component and a reflector, and then returning the measurement light to a first photoeletric detector and a second photoeletric detector.

sequentially processing the reference light by a second polarization splitting prism, a second ¼ wave plate, a second splitting prism and a reflecting mirror, and then returning the reference light to the first photoeletric detector and the second photoeletric detector; forming a reference signal by the second photoeletric detector according to the processed measurement light and the processed reference light; and determining displacement information of the object to be detected according to the measurement signal and the reference signal.

It should be noted that the embodiment of the interferometer displacement measurement method of the present disclosure may refer to the descriptions in the embodiment of the interferometer displacement measurement system, which will not be repeated herein.

The interferometer displacement measurement system and the interferometer displacement measurement method provided by the present disclosure utilizes a specially processed optical waveguide component to eliminate the impact on the measurement due to light spot separation caused by the rotation of the object to be measured. The optical waveguide component utilizes the focusing characteristic of the plano-convex lens and the specially processed optical fiber to transfer light, so that being capable to ensure no light beam separation in the incident light and the emitting light, and the size of the light spot can be reduced after eliminating the light spot separation, thus it has wider angle measurement range and displacement measurement stroke during measurement. Meanwhile, compared with the large light spot, the small light spot is less susceptible to environmental influence, thus it can be known that the interferometer displacement measurement system without light spot separation in the present disclosure has advantages such as high measurement accuracy, large angle measurement range, large measurement stroke and small air disturbance error.

The interferometer displacement measurement system and interferometer displacement measurement method according to the present disclosure are described by example with reference to the drawings. However, those skilled in the art should understand that various improvements can be made to the interferometer displacement measurement system and the interferometer displacement measurement method provided in the present disclosure without departing from the content of the present disclosure. Therefore, the protection scope of the present disclosure should be defined by the contents of the accompanying claims.

What is claimed is:

1. An interferometer displacement measurement system comprising:
    a first laser light source for emitting measurement light;
    a first polarization splitting prism, a first photoeletric detector, a first ¼ wave plate, a first splitting prism, an optical waveguide component and a reflector disposed on one side of the first laser light source sequentially, wherein an object to be detected is fixed on the reflector;
    a second laser light source for emitting reference light; and
    a second polarization splitting prism, a second photoeletric detector, a second ¼ wave plate, a second splitting prism and a reflecting mirror disposed on one side of the second laser light source sequentially, wherein the reflecting mirror is attached to the second splitting prism side,
    wherein the measurement light is processed by the first polarization splitting prism, the first ¼ wave plate, the first splitting prism, the optical waveguide component and the reflector, and then is returned to the first photoeletric detector and the second photoeletric detector,
    wherein the reference light is processed by the second polarization splitting prism, the second ¼ wave plate, the second splitting prism and the reflecting mirror, and then is returned to the first photoeletric detector and the second photoeletric detector,
    wherein the first photoeletric detector generates a measurement signal according to the processed measurement light and the processed reference light, and the second photoeletric detector generates a reference signal according to the processed measurement light and the processed reference light,
    wherein displacement information of the object to be detected is determined according to the measurement signal and the reference signal,
    wherein the optical waveguide component comprises: a lens fixing element; a first plano-convex lens and a second plano-convex lens disposed within the lens fixing element; and a waveguide fiber and a reflective film positioned between the first plano-convex lens and the second plano-convex lens,
    wherein the lens fixing element has a barrel shape and includes a wall between the first plano-convex lens and the second plano-convex lens,
    wherein the lens fixing element is made of glass, and the reflective film is attached to a right surface of the wall of the lens fixing element adjacent to the reflector,
    wherein a focal length of the first plano-convex lens is a first focal length, and a focal length of the second plano-convex lens is a second focal length,
    wherein the waveguide fiber passes through the wall with opposite end surfaces thereof respectively flush with the left surface and the right surface of the wall of the lens fixing element, and
    wherein a distance between the first plano-convex lens and the left surface of the wall of the lens fixing element is equal to the first focal length, and a distance from the second plano-convex lens to the right surface of the wall of the lens fixing element is equal to the second focal length.

2. The interferometer displacement measurement system according to claim 1,
    wherein the first focal length equals to the second focal length.

3. The interferometer displacement measurement system according to claim 1,
    wherein the measurement light is transmitted by the first polarization splitting prism and passes through the first ¼ wave plate, and then is divided into a first transmission light and a first reflection light by the first splitting prism, wherein the first transmission light is coupled to the waveguide fiber after passing through the first plano-convex lens, and then passes through the second plano-convex lens to arrive at the reflector,
    wherein the light reflected back by the reflector passes through the second plano-convex lens to arrive at the reflective film, and is reflected to the reflector by the reflective film again, and the light reflected by the reflector is coupled to the waveguide fiber after passing through the second plano-convex lens again, and passes through the first plano-convex lens, the first splitting prism and the first ¼ wave plate sequentially to become a first s-polarized light, and
    wherein the first s-polarized light is reflected to the first photoeletric detector by the first polarization splitting prism.

4. The interferometer displacement measurement system according to claim 3, wherein the first reflection light of the first splitting prism is reflected by the second splitting prism, and the reflected light passes through the second ¼ wave plate to become a second s-polarized light; and
    wherein the second s-polarized light is reflected to the second photoeletric detector by the second polarization splitting prism.

5. The interferometer displacement measurement system according to claim 4, wherein the reference light transmits through the second polarization splitting prism and then is divided into a second transmission light and a second reflection light by the second ¼ wave plate and the second splitting prism, wherein the second transmission light is reflected back by the reflecting mirror, and passes through the second splitting prism and the second ¼ wave plate to become a third s-polarized light,
  wherein the third s-polarized light is reflected to the second photoeletric detector by the second polarization splitting prism,
  wherein the second reflection light passes through the first polarization splitting prism and then passes through the first ¼ wave plate to become a fourth s-polarized light, and
  wherein the fourth s-polarized light is reflected to the first photoeletric detector by the second polarization splitting prism.

6. The interferometer displacement measurement system according to claim 5,
  wherein the first photoeletric detector is configured to form the measurement signal according to light beam interference and photoelectric conversion of the first s-polarized light and the fourth s-polarized light, and
  wherein the second photoeletric detector is configured to form the reference signal according to light beam interference and photoelectric conversion of the second s-polarized light and the third s-polarized light.

7. The interferometer displacement measurement system according to claim 1,
  wherein both of the measurement light and the reference light are p-polarized light, and
  wherein the reflector comprises a reflecting mirror or a grating.

8. The interferometer displacement measurement system according to claim 1, wherein an expression formula of the displacement information of the reflecting device is:

$$\Delta z = \frac{\lambda(\varphi_1 - \varphi_2)}{2\pi \times 2\left(1 + \frac{1}{\cos\theta}\right)}$$

wherein $\Delta z$ is the displacement information, $\lambda$ is a wavelength of the light beam in the air, $\varphi_1$ is the phase of the measurement signal after phase discrimination, and $\varphi_2$ is the phase of the reference signal after phase discrimination, $\theta$ is an angle between the reflector and a surface perpendicular to an axis direction of the lens fixing element.

9. An interferometer displacement measurement method for measuring displacement of an object to be measured by the interferometer displacement measurement system of claim 1, comprising following steps:
  emitting measurement light by a first laser source, and emitting reference light by a second laser source;
  sequentially processing the measurement light by a first polarization splitting prism, a first ¼ wave plate, a first splitting prism, an optical waveguide component and a reflector, and then returning the measurement light to a first photoeletric detector and a second photoeletric detector, and generating a measurement signal by the first photoeletric detector according to the processed measurement light and the processed reference light;
  at the same time, processing the reference light by a second polarization splitting prism, a second ¼ wave plate, a second splitting prism and a reflecting mirror, and then returning the reference light to the first photoeletric detector and the second photoeletric detector and generating a reference signal by the second photoeletric detector according to the processed measurement light and the processed reference light; and
  determining displacement information of the object to be detected according to the measurement signal and the reference signal.

10. The interferometer displacement measurement system according to claim 6,
  wherein both of the measurement light and the reference light are p-polarized light, and
  wherein the reflector comprises a reflecting mirror or a grating.

* * * * *